(12) United States Patent
Jeong et al.

(10) Patent No.: US 10,524,301 B2
(45) Date of Patent: Dec. 31, 2019

(54) METHOD AND DEVICE FOR CONTROLLING QUALITY OF SERVICE IN WIRELESS LAN

(71) Applicant: Samsung Electronics Co., Ltd., Gyeonggi-do (KR)

(72) Inventors: Sangsoo Jeong, Gyeonggi-do (KR); Songyean Cho, Seoul (KR); Beomsik Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/783,627

(22) PCT Filed: Jun. 20, 2014

(86) PCT No.: PCT/KR2014/005490
§ 371 (c)(1),
(2) Date: Oct. 9, 2015

(87) PCT Pub. No.: WO2014/204276
PCT Pub. Date: Dec. 24, 2014

(65) Prior Publication Data
US 2016/0100446 A1  Apr. 7, 2016

(30) Foreign Application Priority Data

Jun. 20, 2013 (KR) ........................ 10-2013-0071227

(51) Int. Cl.
*H04W 76/15* (2018.01)
*H04W 12/06* (2009.01)
(Continued)

(52) U.S. Cl.
CPC ........... *H04W 76/15* (2018.02); *H04W 12/06* (2013.01); *H04W 76/16* (2018.02); *H04W 88/06* (2013.01); *H04W 84/12* (2013.01)

(58) Field of Classification Search
CPC ................................................. H04W 76/026
See application file for complete search history.

(56) References Cited

U.S. PATENT DOCUMENTS

2009/0131053 A1* 5/2009 Sachs ................ H04W 36/0016
455/436
2010/0039936 A1* 2/2010 Jin .......................... H04L 47/10
370/230
(Continued)

FOREIGN PATENT DOCUMENTS

CN  101742502 A  6/2010
CN  102143489 A  8/2011
(Continued)

OTHER PUBLICATIONS

Extended European Search Report dated Jun. 1, 2016 in connection with European Application No. 14813059.4, 8 pages.
(Continued)

*Primary Examiner* — Anh Vu H Ly

(57) ABSTRACT

A method for transmitting/receiving, by a User Equipment, a signal in a mobile communication system includes: transmitting an authentication request message to a wireless LAN; receiving an authentication response message corresponding to the authentication request message from the wireless LAN; and transmitting, to a base station, a message for supporting a multi-connection mode based on the authentication response message. It is possible to generate an access connection or to provide a QoS setting when simultaneously accessing a 3GPP system and a non-3GPP system and transmitting/receiving data, so that a more improved method and device for transmitting and receiving data can be provided to a user.

16 Claims, 13 Drawing Sheets

(51) Int. Cl.
*H04W 88/06* (2009.01)
*H04W 76/16* (2018.01)
*H04W 84/12* (2009.01)

(56) References Cited

U.S. PATENT DOCUMENTS

| | | | |
|---|---|---|---|
| 2011/0199987 A1 | 8/2011 | Rommer et al. | |
| 2011/0216743 A1 | 9/2011 | Bachmann et al. | |
| 2012/0297474 A1 | 11/2012 | Zhang et al. | |
| 2013/0005332 A1* | 1/2013 | Sedlacek | H04W 12/06 455/426.1 |
| 2013/0121322 A1* | 5/2013 | Salkintzis | H04W 76/022 370/338 |
| 2013/0142172 A1 | 6/2013 | Parsons et al. | |
| 2013/0272163 A1* | 10/2013 | Qiang | H04W 74/004 370/254 |
| 2014/0016629 A1* | 1/2014 | Pancorbo Marcos | H04L 12/5692 370/338 |
| 2014/0036807 A1* | 2/2014 | Huang | H04W 76/021 370/329 |
| 2014/0086226 A1* | 3/2014 | Zhao | H04W 76/022 370/338 |
| 2014/0119292 A1* | 5/2014 | Zhao | H04W 76/02 370/329 |
| 2014/0185603 A1* | 7/2014 | Kaippallimalil | H04W 12/08 370/338 |
| 2014/0204927 A1* | 7/2014 | Horn | H04W 8/26 370/338 |
| 2014/0241333 A1* | 8/2014 | Kim | H04W 48/16 370/338 |
| 2015/0023277 A1* | 1/2015 | Kim | H04W 36/14 370/329 |
| 2015/0117406 A1* | 4/2015 | Kim | H04W 36/0022 370/331 |
| 2015/0282026 A1* | 10/2015 | Gupta | H04W 88/08 370/331 |
| 2015/0327110 A1* | 11/2015 | Jeong | H04W 48/20 370/338 |
| 2016/0112896 A1* | 4/2016 | Karampatsis | H04W 28/0252 370/230.1 |

FOREIGN PATENT DOCUMENTS

| | | |
|---|---|---|
| CN | 102388639 A | 3/2012 |
| CN | 101742502 B | 10/2012 |
| EP | 2312890 A1 | 4/2011 |
| WO | WO 2009/083429 A1 | 7/2009 |
| WO | WO 2013/000991 A1 | 1/2013 |

OTHER PUBLICATIONS

3GPP TR 23.852, V1.6.0, "3rd Generation Partnership Project; Technical Specification Group Services and System Aspects; Study on S2a Mobility based on GTP & WLAN access to EPC (SaMOG); Stage 2 (Release 12)"., Jun. 2013, 163 pages.

Motorola Mobility, "Update on PPP over Ethernet Solution" 3GPP TSG SA WG2 Meeting #96, Apr. 8-12, 2013, San Diego, California, TD S2-131447, 12 pages.

ZTE, "Analysis of Policy/QoS Control Interfaces for the P4C_TI and P4C_TC", SA WG2 Meeting #92, S2-012118, Jul. 9-13, 2012, Barcelona, Spain, 4 pages.

International Search Report dated Oct. 8, 2014 in connection with International Patent Application No. PCT/KR2014/005490, 7 pages.

Written Opinion of the International Searching Authority dated Oct. 8, 2014 in connection with International Patent Application No. PCT/KR2014/005490, 6 pages.

3GPP TS 23.401, V12.0.0, "3rd Generation Partnership Project; Technical Specification Group Services and System Aspects; General Packet Radio Service (GPRS) Enhancements for Evolved Universal Terrestrial Radio Access Network (E-UTRAN) Access (Release 12)", Mar. 7, 2013, 289 pages.

Communication from a foreign patent office in a counterpart foreign application, State Intellectual Property Office of the People's Republic of China, "The First Office Action," Application No. CN 201480029430.4, Jul. 10, 2018, 31 pages.

3GPP TR 23.852 V1.6.0 (2013-06), Technical Report, 3rd Generation Partnership Project; Technical Specification Group Services and System Aspects; Study on S2a Mobility based on GTP & WLAN access to EPC (SaMOG); Stage 2 (Release 12), 163 pages.

Office Action dated Dec. 20, 2018 in connection with European Patent Application No. 14 813 059.4, 6 pages.

"3rd Generation Partnership Project; Technical Specification Group Core Network and Terminals; Mobile radio Interface Layer 3 specification; Core network protocols; Stage 3 (Release 12)", 3GPP TS 24.008 V12.1.0 (Mar. 2013), 3 pages.

European Search Report dated Nov. 8, 2019 in connection with European Patent Application No. 19 19 2462, 9 pages.

* cited by examiner

METHOD AND DEVICE FOR CONTROLLING QUALITY OF SERVICE IN WIRELESS LAN

CROSS-REFERENCE TO RELATED APPLICATION(S)

The present application claims priority under 35 U.S.C. § 365 to International Patent Application No. PCT/KR2014/005490 filed Jun. 20, 2014, entitled "METHOD AND DEVICE FOR CONTROLLING QUALITY OF SERVICE IN WIRELESS LAN", and, through International Patent Application No. PCT/KR2014/005490, to Korean Patent Application No. 10-2013-0071227 filed Jun. 20, 2013, each of which are incorporated herein by reference into the present disclosure as if fully set forth herein.

TECHNICAL FIELD

The embodiments of the present invention relate to a technology for providing a service of effectively transmitting/receiving data simultaneously using a 3GPP system and a non-3GPP system in a network in which the 3GPP system and the non-3GPP system coexist. Particularly, the embodiments of the present invention relate to a technology for controlling the quality of service by generating an access connection and providing an appropriate QoS setting to a User Equipment and an access network when simultaneously accessing a 3GPP system and a non-3GPP system and transmitting/receiving data.

BACKGROUND ART

In general, a mobile communication system was developed to provide a voice service while guaranteeing activity of users. However, the mobile communication system has gradually expanded a service area thereof from the voice service to a data service. In recent years, the mobile communication system has been developed to the extent that a high-speed data service can be provided. However, since there are a resource shortage phenomenon and a demand for a higher speed service by users in the current mobile communication system providing services, a more-advanced mobile communication system is needed.

To meet the demand, standardization of Long Term Evolution (LTE) is being progressed by 3rd Generation Partnership Project (3GPP) as one of next generation mobile communication systems which are being developed. LTE is a technology for implementing high speed packet based communication having a transmission rate of a maximum of 100 Mbps. For the transmission rate, various plans are being discussed. For example, there are plans to reduce the number of nodes located on a communication path through a simple network structure and to bring wireless protocols as close as possible to a wireless channel.

In such a mobile communication system, a User Equipment can use a plurality of heterogeneous networks at the same time. Specifically, the User Equipment can use a 3GPP access network, such as a GERAN, an UTRAN, or an E-UTRAN, and a non-3GPP access network, such as a WLAN, at the same time. For example, a User Equipment can access an E-UTRAN and transmit/receive data, and simultaneously, can access a WLAN for other traffic and transmit/receive data. For such simultaneous accesses to heterogeneous networks, a method for exchanging parameters between a User Equipment and the networks, and a method for controlling QoS are required.

DISCLOSURE OF INVENTION

Technical Problem

The present invention has been made in an effort to solve the above-described problem and aims to provide a method and device for transmitting information (or a parameter) related to a connection from a User Equipment to a network system in order for the User Equipment to generate the connection simultaneously using a 3GPP system and a non-3GPP system. In addition, in order to control the quality of service of a generated connection, a method and device for transferring a setting or parameter for control of the quality of service from a network system to a non-3GPP system and a User Equipment and applying a packet transmission control according to the setting or parameter are required.

Solution to Problem

In accordance with an aspect of the present invention, a method for transmitting/receiving, by a User Equipment, a signal in a mobile communication system includes: transmitting an authentication request message to a wireless LAN; receiving an authentication response message corresponding to the authentication request message from the wireless LAN; and transmitting, to a base station, a message for supporting a multi-connection mode based on the authentication response message.

In accordance with another aspect of the present invention, a method for transmitting/receiving, by a wireless LAN, a signal in a mobile communication system includes: receiving an authentication request message from a User Equipment; transmitting an authentication response message corresponding to the authentication request message to the User Equipment; and receiving, from the User Equipment, a message for supporting a multi-connection mode based on the authentication response message.

In accordance with still another aspect of the present invention, a User Equipment in a mobile communication system includes: a transmission/reception unit for transmitting/receiving a signal to/from a wireless LAN; and a controller for controlling the transmission/reception unit, and controlling the User Equipment to transmit an authentication request message to the wireless LAN, to receive an authentication response message corresponding to the authentication request message from the wireless LAN, and to transmit, to a base station, a message for supporting a multi-connection mode based on the authentication response message.

In accordance with still another aspect of the present invention, a wireless LAN in a mobile communication system includes: a transmission/reception unit for transmitting/receiving a signal to/from a User Equipment; and a controller for controlling the transmission/reception unit, and controlling the wireless LAN to receive an authentication request message from the User Equipment, to transmit an authentication response message corresponding to the authentication request message to the User Equipment, and to receive, from the User Equipment, a message for supporting a multi-connection mode based on the authentication response message.

Advantageous Effects of Invention

According to the embodiments of the present invention, it is possible to generate an access connection or to provide a QoS setting when simultaneously accessing a 3GPP system and a non-3GPP system and transmitting/receiving data, so that a more improved method and device for transmitting and receiving data can be provided to a user.

MODE FOR THE INVENTION

Hereinafter, preferred embodiments of the present invention will be described in detail with reference to the accompanying drawings. In the following description, a detailed description of known functions and configurations incorporated herein will be omitted when it may obscure the subject matter of the present invention.

In addition, in the following detailed description of embodiments of the present invention, a basic 3rd Generation Partnership Project (3GPP) LTE system will be considered as a main subject, and in a case of a non-3GPP access network, a WLAN will be considered as a main subject. However, subject matters of embodiments of the present invention may be applied even to other communication/ computer systems having a similar technical background and a similar system form through a little transformation without largely departing from the scope of the present invention, and this application can be performed on the basis of the determination of those skilled in the art of the present invention.

Figure 1:
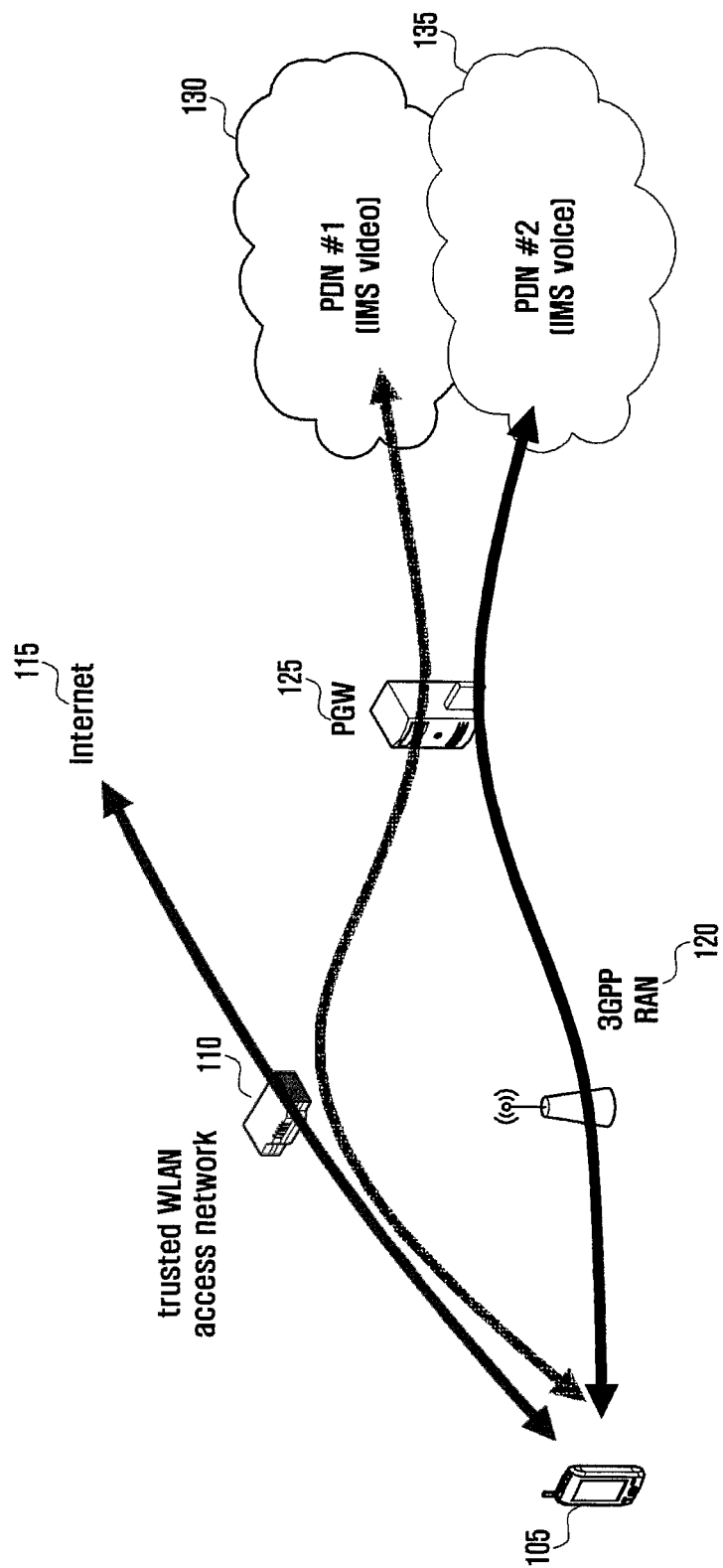
FIG. 1 is a view illustrating a case where data is transmitted and received using a 3GPP access network and a non-3GPP access network at the same time.

FIG. 1 is a view illustrating a case where data is transmitted and received using a 3GPP access network and a non-3GPP access network at the same time.

Referring to FIG. 1, this embodiment shows an example in which a User Equipment 105 uses a WLAN 110 as a non-3GPP access network. According to an embodiment, the WLAN 110 may be a trusted WLAN access network provided by a 3GPP provider, but is not limited thereto. The User Equipment may transmit/receive data to/from a network, including the Internet 115, through the WLAN 110.

As shown in FIG. 1, while generating at least one PDN connection and transmitting data to a 3GPP access network including a 3GPP base station 120 and a PDN gateway (PGW) 125, the User Equipment 105 can generate at least another PDN connection and transmit data to the WLAN 110, and other pieces of data may be transmitted in the form of non-seamless WLAN offloading (NSWO) in which the WLAN is directly connected to an Internet network 115 to be offloaded. According to an embodiment, the User Equipment may transmit/receive data to/from a PDN#1 130 and a PDN#2 135 through one or more connections.

In particular, as shown in FIG. 1, the WLAN 110 can be connected directly to the PGW 125 to generate a PDN connection, without an ePDG which has been used to overcome the poor security of the existing non-3GPP access network. An access network configured with the WLAN 110, which can be connected directly to the PGW 125 to provide a service without an ePDG, as described above, may be called a trusted WLAN access network (TWAN).

Figure 2:
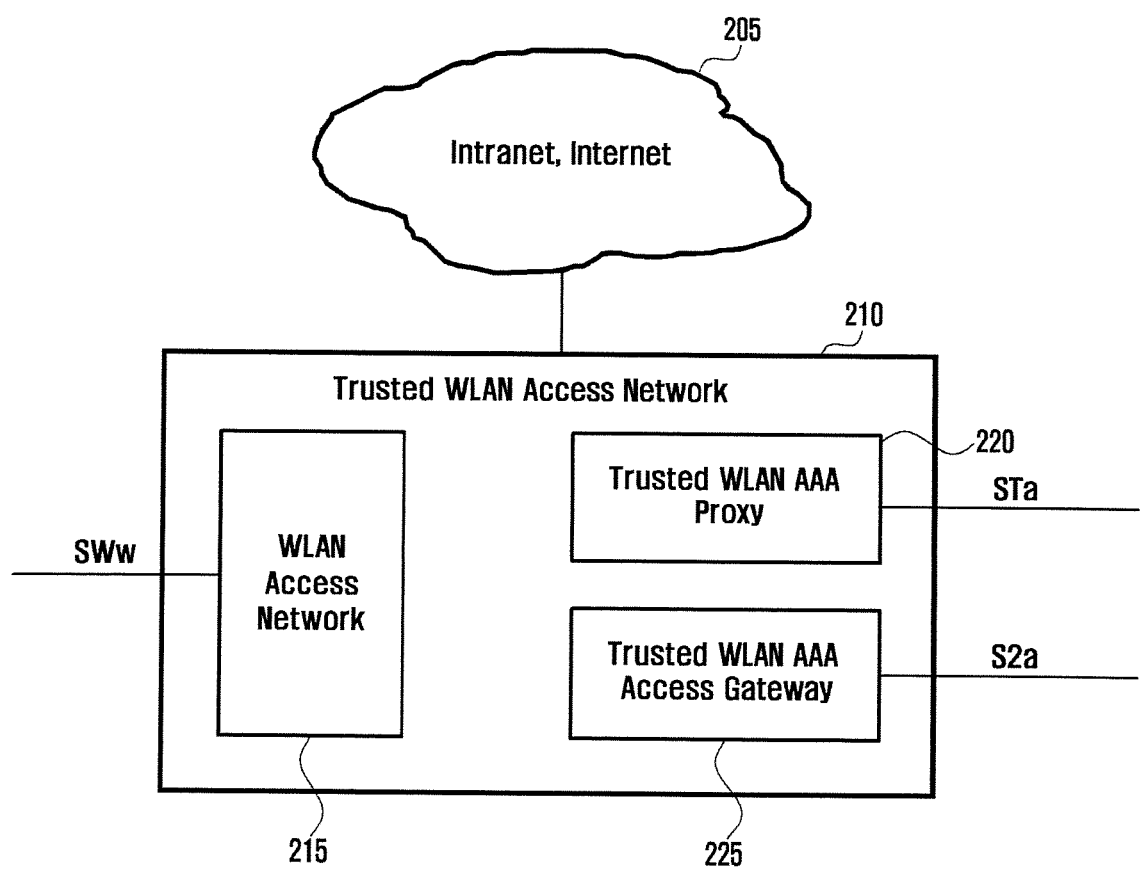
FIG. 2 is a diagram illustrating the configuration of a trusted WLAN access network (TWAN) according to an embodiment of the present invention.

FIG. 2 is a diagram illustrating the configuration of a trusted WLAN access network (TWAN) according to an embodiment of the present invention.

Referring to FIG. 2, a TWAN 210 may include: a WLAN access network 215 configured to include one or more WLANs (e.g.: Access Point, AP); a trusted WLAN Authentication, Authorization, and Accounting (AAA) proxy 220 configured to interwork with an AAA server; and a trusted WLAN access gateway (TWAG) 225 configured to connect the WLAN access network 215 and a P-GW. In more detail, the TWAN 210 may be implemented on the same entity as the TWAG 225, or may be implemented as a separate entity. In addition, according to an embodiment, the TWAN 210 may include a transmission/reception unit capable of transmitting/receiving signals to/from the User Equipment and another communication entity. In addition, according to an embodiment, the TWAN 220 may include a controller which can control the operation of the TWAN 220 according to an embodiment of the present invention.

An interface between the TWAG 210 and the P-GW is referred to as S2a, wherein a protocol such as a GTP or PMIP may be used. The above structure is only a logical structure, and, in practice, a physical configuration may be more free. The name of the interface may vary according to embodiments.

In addition, the trusted WLAN AAA proxy 220 and the AAA may be connected to each other through an STa interface, and the WLAN access network and the User Equipment may be connected to each other through an SWw interface (generally, an air interface based on 802.11).

In order for the User Equipment to generate one or more PDN connections through the TWAN 210, or simultaneously, to use the NSWO, the User Equipment must be able to transmit one or more of the following pieces of information to the TWAN 210.
1. Whether multiple PDN connections are supported
2. Whether a requested connection corresponds to NSWO
3. Access point name (APN) of a PDN connection
4. HO indicator representing a new connection (i.e. an initial attach) or a handover to an already generated PDN connection
5. PDN type (IP version)

According to an embodiment, whether multiple PDN connections are supported may represent whether a multi-connection mode is supported.

According to an embodiment, among the above pieces of information, information of clauses 1 and 2 may be transferred by extending an extensible authentication protocol (EAP) message exchanged between the User Equipment and the WLAN 210.

In addition, according to an embodiment, among the above pieces of information, information of clauses 3, 4 and 5 is information which the User Equipment must transfer to the TWAG 225, and may be transferred using a layer-3 protocol message. Here, the layer-3 protocol is a protocol between the User Equipment and the TWAG 225. The layer-3 protocol message must be able to be encapsulated in a MAC protocol message between the User Equipment and a non-3GPP access network (e.g.: WLAN) and to be transferred between the User Equipment and the TWAG 225. In this embodiment, the name of the protocol of layer-3 is only illustrative, and may be replaced with any other name. As described above, according to an embodiment, a layer-3 message may be used to exchange control information between the User Equipment and the TWAG, wherein, according to an embodiment, the layer-3 message may be, for example, a WLAN control protocol (WLCP) message. Throughout the embodiments, a WLCP message will be described as a layer-3 message.

Figure 3:
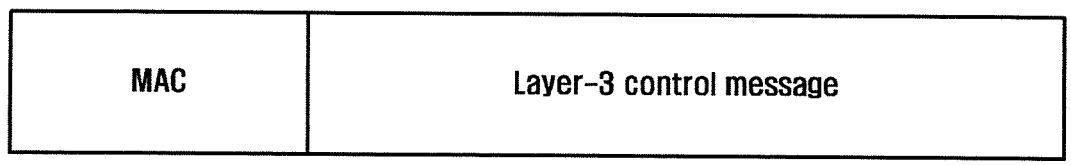
FIG. 3 is a diagram illustrating the format of a layer-3 control message according to an embodiment of the present invention.

FIG. 3 is a diagram illustrating the format of a layer-3 control message according to an embodiment of the present invention.

Referring to FIG. 3, a layer-3 control protocol may be a new type of protocol for a control plane between a User Equipment and a TWAG, may be implemented by extending an existing PPP/PPPoE message, or may be implemented by extending a DHCP message.

According to embodiments, a layer-3 request message transmitted from a User Equipment to a TWAG may be an attach request or a PDN connectivity request in the case of a new protocol, may be a PPPoE discovery request message in the case where a PPP/PPPoE has been extended, or may be a DHCPv4 discovery message or a DHCPv6 information request message in the case where a DHCP has been extended.

In addition, according to embodiments, a layer-3 response message transmitted from a TWAG to a User Equipment may be an attach accept message or a PDN connectivity accept (activate connection request) message in the case of a new protocol, may be a PPPoE discovery session-confirmation message in the case where a PPP/PPPoE has been extended, or may be a DHCPv4 Offer/Ack or a DHCPv6 Reply in the case where a DHCP has been extended.

Meanwhile, according to an embodiment, in order to transfer a layer-3 control message through a layer-3 protocol, a MAC frame may include, in the header thereof, an EtherType field representing that a corresponding packet is a layer-3 control message. When the EtherType field of a packet received through 802.11 MAC represents a control message of a layer-3 protocol, the 802.11 MAC transfers the payload of the received packet to a layer-3 processing part.

Figure 4:
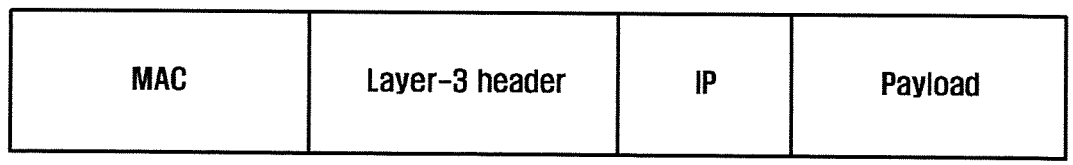
FIG. 4 is a diagram illustrating the format of a message according to another embodiment of the present invention.

FIG. 4 is a diagram illustrating the format of a message according to another embodiment of the present invention.

Referring to FIG. 4, when a similar concept is applied, user data (generally, an IP datagram) other than a control message may be transmitted and received through a non-3GPP access network by attaching a layer-3 header to the IP datagram and attaching a MAC header.

In this embodiment, the layer-3 header used for user data may include an ID for a logical connection (e.g.: a PDN connection, and more particularly, a bearer or an IP flow) generated between a User Equipment and a TWAG. That is to say, only one air link may be generated between a User Equipment and a WEAN. In this case, in order to distinguish a plurality of logical connections (a PDN connection, a bearer, or an IP flow) from each other in the one air link, a layer-3 header may be attached, and an ID (e.g.: a PDN connection ID, a session ID, or the like) for a logical connection may be included therein.

Meanwhile, a MAC packet header containing user data may include an EtherType field representing that a corresponding packet is layer-3 user data. In an embodiment, when the EtherType field of a packet received through 802.11 MAC represents user data of a layer-3 protocol, the 802.11 MAC transfers the payload of the received packet to a layer-3 processing part. Here, the EtherType of layer-3 user data may have the same value as the aforementioned EtherType for a layer-3 control message.

When a User Equipment transfers the pieces of information to a TWAN, the TWAN may transfer one or more of the following pieces of information to the User Equipment in response thereto.
1. Whether a network supports multiple PDN connections
2. Whether a generated connection is NSWO
3. Access point name (APN) of a generated PDN connection
4. IP address of a PDN connection
5. User plane connection ID (PDN connection ID, bearer ID, flow ID, or the like)
6. PDN type (IP version)

According to an embodiment, among the above pieces of information, information of clauses 1 and 2 may be transferred by extending an extensible authentication protocol (EAP) message exchanged between the User Equipment and the WLAN. Among the above pieces of information, information of clauses 1, 2, 3, 4, 5 and 6 may be transferred by a TWAG to the User Equipment using a message of a layer-3 protocol. In addition, according to an embodiment, information of clauses 3, 4, 5 and 6 may be transferred from the TWAG to the User Equipment using a message of a layer-3 protocol.

Figure 5:
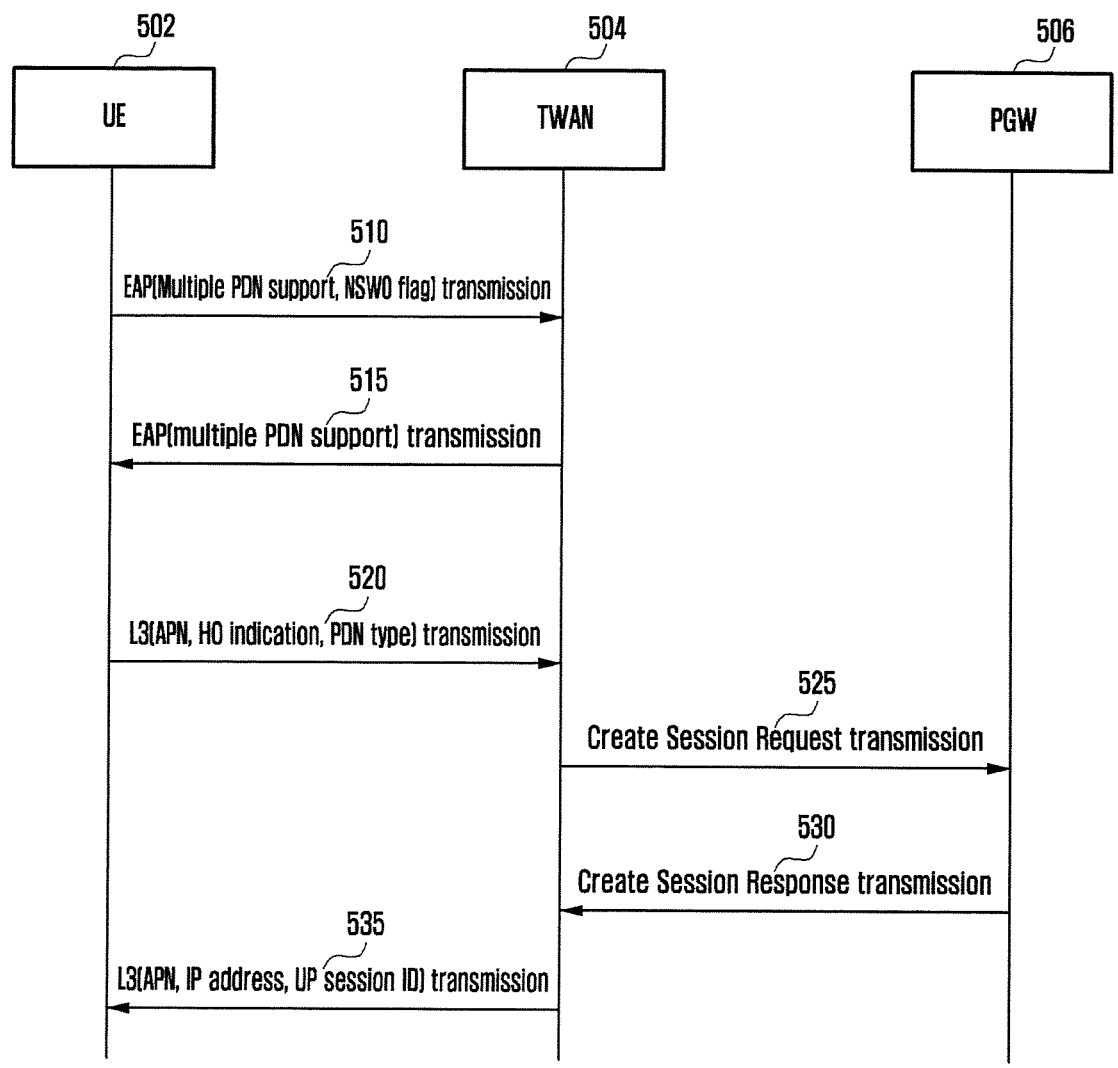
FIG. 5 is a diagram illustrating a procedure in which a User Equipment generates a connection through a TWAN according to an embodiment of the present invention.

FIG. 5 is a diagram illustrating a procedure in which a User Equipment generates a connection through a TWAN according to an embodiment of the present invention. In more detail, FIG. 5 is a diagram illustrating a procedure in which a User Equipment generates a connection (NSWO, generation of a new PDN connection, or an HO to an existing PDN connection) through a TWAN.

Referring to FIG. 5, according to an embodiment, signals are transmitted and received between a User Equipment (UE) 502, a TWAN 504, and a PGW 506.

In operation 510, the UE 502 may transmit an extensible authentication protocol (EAP) request to the TWAN 504. The EAP request may include whether multiple PDNs are supported and/or an NSWO flag. According to an embodiment, the EAP request may be referred to as an authentication request. In operation 515, the TWAN 504 may transmit an EAP response to the UE 502. The EAP response may include a response to whether multiple PDNs are supported and/or a flag indicating that an NSWO connection has been generated. According to an embodiment, the EAP response may be referred to as an authentication response.

In operation 520, the UE 502 may transmit a message of a layer-3 protocol to the TWAN 504 on the basis of a message received in operation 515. The layer-3 message may include one or more of an APN, an HO indication and a PDN type. In addition, according to an embodiment, the UE 502 may transmit information to the TWAN 504 using a layer-3 message when the TWAN 504 supports multiple PDNs.

In operation 525, the TWAN 504 may transmit a Create Session Request message to the PGW 506 on the basis of the message received in operation 520.

In operation 530, the PGW 506 may transmit a Create Session Response on the basis of the request received in operation 525.

In operation 535, the TWAN 504 may transmit a layer-3 message to the UE 502. The layer-3 message may include one or more of an APN, an IP address, and an UP connection ID.

As described in the embodiments of the present invention, in order to generate a plurality of logical connections through the TWAN 504 and to transmit/receive data, a layer-3 protocol may be introduced. In this case, in order to distinguish which of packets encapsulated in a WLAN MAC (i.e. 802.11 MAC) is a layer-3 protocol packet, it is necessary to use EtherType information, as described above. To this end, the WLAN access network of the TWAN 504 may insert an EtherType value to be used for layer-3 into a response message to an EAP request of the UE 502, and then transfer the response message. That is to say, an EtherType may be contained in the EAP response which the TWAN 504 transfers to the UE 502 in operation 515 (especially, a separate EtherType for control/user data may be transferred), and the UE 502 which has received the EtherType may use the EtherType in order to distinguish layer-3 control/user data packets generated in the future.

Next, a method for applying/controlling QoS in a service using a TWAN (especially, when generating a PDN connection to a specific APN using S2a) is proposed. Controlling QoS in an S2a-based service, as described above, may be particularly important in a Voice-over-WLAN/WiFi (VoW-LAN/VoWiFi) service for voice service provision and in a video transmission service. Such QoS control for data transmitted/received through a TWAN may be performed by a TWAG in the case of downlink (from the TWAG to a UE), and by the UE in the case of uplink (from the UE to the TWAG).

Conceptually, QoS control through a TWAN is to perform a simple mapping to an access class (AC) or 802.1p priority/designation available in the TWAN using QoS parameters (i.e. QCI, ARP, APN, GBR, and the like) which are used in a 3GPP network, and then to apply EDCA parameters defined in the 802.11 standard. Another alternative is to adjust EDCA parameters of 802.11e using QoS parameters which are used in a 3GPP network. When QoS control must be performed by a UE, the mapping-related information (i.e. AC) and EDCA parameters may be transferred to the UE, and a traffic transmission may be determined on the basis of the transferred information and parameters.

For example, a mapping rule of ACs according to QC's may be taken into consideration as follows. As shown in Table 1 below, a control message QCI 5 for voice traffic may be mapped to an AC (AC_VO, priority 7) having the highest priority because the control message QCI 5 for voice traffic has a very high priority, and similarly, media QCI 1 of voice traffic may be mapped to an AC (AC_VO or priority 6) because the media QCI 1 of voice traffic has a high priority. Similarly, video QCI 2 or 4 having a high priority may be mapped to an AC (AC VI or priority 5). Generally, best effort traffic QCI 9 or 6 may be mapped to an AC (AC_BK or AC_BE). The specified mapping relation may vary depending on embodiments, and basically, ACs to be mapped may be controlled on the basis of the priorities of traffic.

TABLE 1

| Priority | 3GPP QCI | [802.1d] 802.1p Priority (UP) | [802.1d] 802.1p Designation | [802.1d] Traffic Type | [802.11e] Access Category (AC) | [802.11e] Designation |
| --- | --- | --- | --- | --- | --- | --- |
| Low | 9 | 1 | BK | Background | AC_BK | Background |
| | 2 | — | | (spare) | AC_BK | Background |
| | 9 | 0 | BE | Best Effort | AC_BE | Best Effort |
| | 7 | 3 | EE | Excellent Effort | AC_BE | Best Effort |
| | 3 | 4 | CL | Controlled Load | AC_VI | Video |
| | 2 or 4 | 5 | VI | Video | AC_VI | Video |
| | 1 | 6 | VO | Voice | AC_VO | Voice |
| High | 5 or 1 | 7 | NC | Network Control | AC_VO | Voice |

The above description is an example of mapping according to the characteristics of traffic, and a main principle is a concept of finding out an AC or a priority to be used in a WLAN through QoS parameters (mainly QCI, wherein ARP, APN, GBR, and the like are additionally taken into consideration) used in 3GPP.

Meanwhile, when an AC or a priority has been determined, a TWAN or a UE using 802.11 determines a parameter to be used in an enhanced distributed channel access (EDCA) operation according to the determined AC or transmission priority. For example, a default EDCA parameter defined in 802.11a or 802.11n may be applied as shown in Table 2 below.

TABLE 2

| AC | CWmin | CWmax | AIFSN | Max TXOP |
| --- | --- | --- | --- | --- |
| Background (AC_BK) | 15 | 1023 | 7 | 0 |
| Best Effort (AC_BE) | 15 | 1023 | 3 | 0 |
| Video (AC_VI) | 7 | 15 | 2 | 3.008 ms |
| Voice (AC_VO) | 3 | 7 | 2 | 1.504 ms |
| Legacy DCF | 15 | 1023 | 2 | 0 |

That is to say, in a 3GPP core network, a voice signaling or media of QCI 1 or 5 is, referring to Table 2, mapped to AC_VO, and a transmission is performed using transmission parameters (Max TXOP=1.504 ms, AIFSN=2, CWmin=3, and CWmax=7) according to the determined AC.

The determined values in Tables 1 and 2 may vary depending on embodiments, and specified numerals may be variably applied according to setting by a provider or a user. When necessary, the setting may be transferred to a User Equipment or devices of a TWAN in a method, such as OMA_DM, and be applied.

Figure 6:
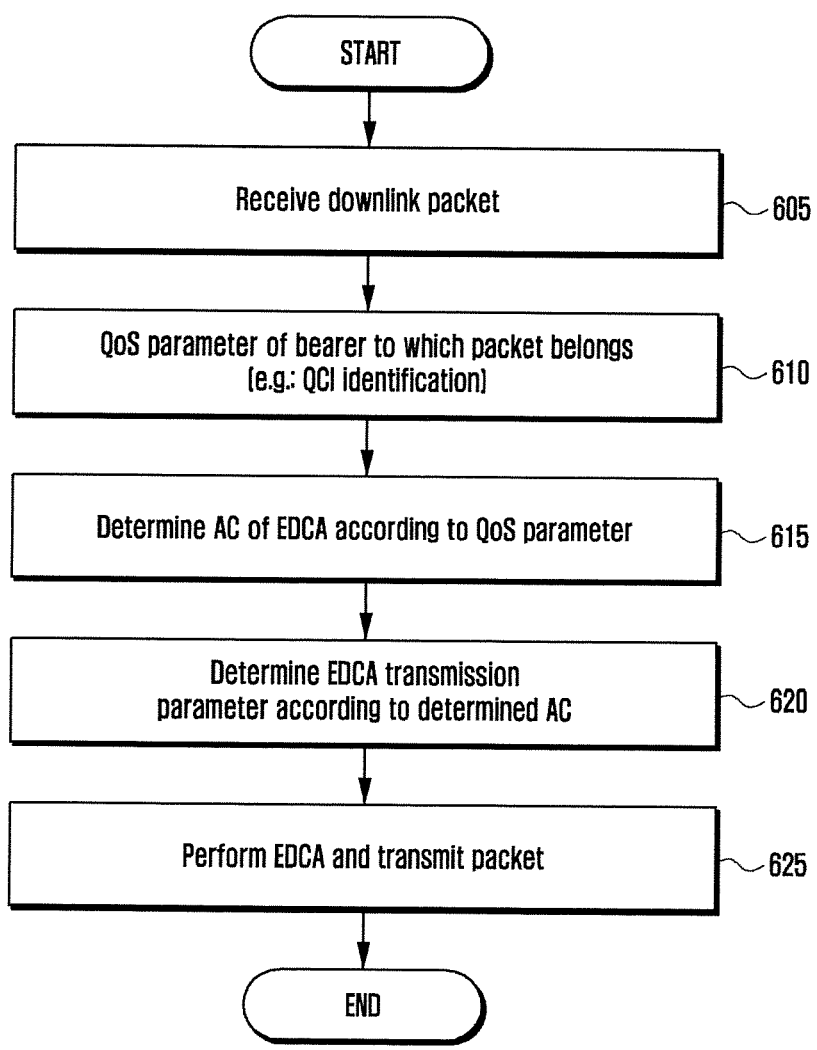
FIG. 6 is a flowchart illustrating a method for controlling quality of service (QoS) in a TWAN according to an embodiment of the present invention.

FIG. 6 is a flowchart illustrating a method for controlling quality of service (QoS) in a TWAN according to an embodiment of the present invention.

Referring to FIG. 6, first, the TWAN may receive a downlink packet from a P-GW in operation 605.

In operation 610, the TWAN may identify a QoS parameter of the packet. According to an embodiment, the TWAN may identify the QoS parameter on the basis of QoS class identifiers (QCIs), and additionally, may take one or more of Allocation and Retention Priority (ARP), Access Point Name (APN), and Guaranteed Bit Rate (GBR) into consideration to identify the QoS parameter.

In operation 615, the TWAN determines an 802.1d-based priority or an AC of an EDCA which is mapped on the basis of the QoS parameter identified in operation 615.

In operation 620, the TWAN may determine a transmission parameter corresponding to a determined AC. According to an embodiment, the corresponding transmission parameter may include one or more of a TXOP, an AIFSN, a CWmin and a CWmax.

In operation 625, the TWAN performs an EDCA operation using parameters determined in operation 620, and transmits a packet. During this operation, information (a determined AC or EDCA parameter) may be exchanged between entities (e.g.: a TWAG and a WLAN AN) in the TWAN. The operations show a detailed operation flow of a TWAN, and a part of the operations may be omitted or may not be performed.

In addition, according to an embodiment, when a TWAN transfers a packet to a User Equipment, the TWAN may determine an AC or an EDCA parameter on the basis of information received from a PGW. In more detail, the AC or EDCA parameter may be determined on the basis of at least one among: service or priority information related to the packet to be transmitted to the User Equipment; Quality of Service (QoS) information of an IP flow related to the packet; and an access point name (APN) related to the packet. The TWAN may match and transmit information related to the QoS of an IP flow, which has been received from the PGW, as described above, with an AC or an EDCA. In addition, the service and priority information may be included in a GTP-U header or an IP header.

In addition, according to an embodiment, the TWAN may transfer QoS-related information, which has been received from the PGW, to the User Equipment, and the User Equipment may transmit an uplink packet according to an AC determined on the basis of the information. In addition, the PGW may transmit a downlink packet according to an AC determined on the basis of the received QoS information or APN information of the received packet. When there is service or priority information related to a downlink packet received from the PGW, a downlink packet may be transmitted according to an AC determined on the basis of the service or priority information. In addition, according to an embodiment, an indicator representing which information is based to determine an AC may be received from the PGW.

Figure 7:
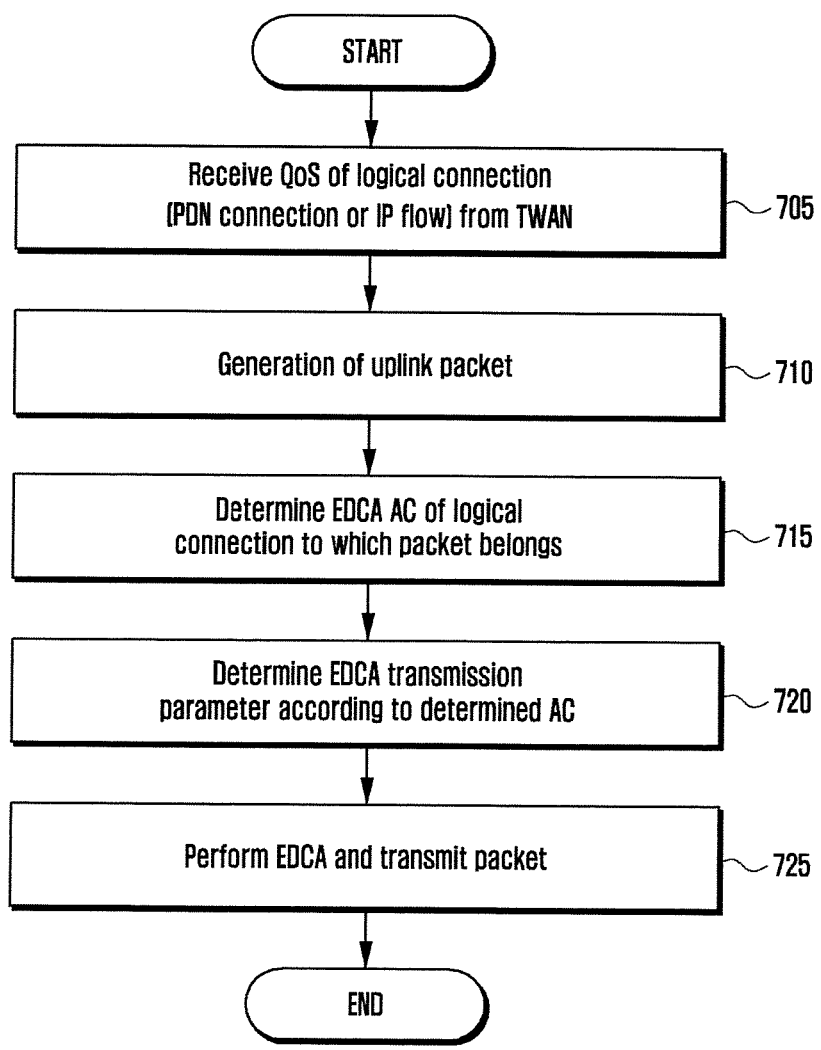
FIG. 7 is a flowchart illustrating a method in which a User Equipment controls QoS according to an embodiment of the present invention.

FIG. 7 is a flowchart illustrating a method in which a User Equipment controls QoS according to an embodiment of the present invention.

Referring to FIG. 7, a User Equipment also may employ the concept described with reference to FIG. 6, and transmit and receive signals.

In operation 705, the User Equipment may receive, from a TWAN, information (an AC or EDCA parameter for connection) for controlling the QoS of an uplink packet. The User Equipment may set the received information, determine an AC to which a generated uplink packet belongs on the basis of the set information, and then perform a transmission using a corresponding EDCA parameter. In more detail, the User Equipment may receive, from the TWAN (or, in more detail, a TWAG), a QoS control rule to be used when each logical connection is generated. When a logical connection generated between the User Equipment and the TWAG is a PDN connection, a layer-3 control message transmitted from the TWAG to the User Equipment may include an ID for designating the logical connection from now on, and an AC or EDCA parameter to be used for the corresponding connection. When the logical connection is a bearer or an IP flow, the layer-3 control message may include an ID of the logical connection, a packet filter (e.g.: an IP 5-tuple, an application ID, an SCI, or a combination thereof) for distinguishing a packet belonging to the connection, and an AC or EDCA parameter (e.g.: the aforementioned TWOP, AFISN, CWmin, CWmax, or the like) to be used for the corresponding connection. When determining an AC or EDCA parameter to be transferred to User Equipment through a layer-3 message, the TWAN (or, in more detail, the TWAG) uses the aforementioned mapping method (i.e. determining an AC on the basis of a 3GPP QoS parameter, such as a QCI, and by extension, determining an EDCA parameter).

When an uplink packet is generated in operation 710, the User Equipment finds out a logical connection to which the generated packet belongs using a set packet filter when necessary in operation 715. In more detail, the User Equipment may determine an EDCA AC of the logical connection.

In operation 720, when a layer-3 control message received from the TWAN to the User Equipment includes an AC, the User Equipment may determine an EDCA parameter corresponding to the AC set for the connection.

In operation 725, the User Equipment performs an EDCA procedure using the determined EDCA parameter, and transmits the packet. According to an embodiment, when a layer-3 control message received from the TWAN includes an EDCA parameter, the User Equipment performs an EDCA procedure using the EDCA parameter set for a connection, and transmits the packet.

The operations show a detailed operation flow of a User Equipment, and a part of the operations may be omitted or may not be performed.

Figure 8:
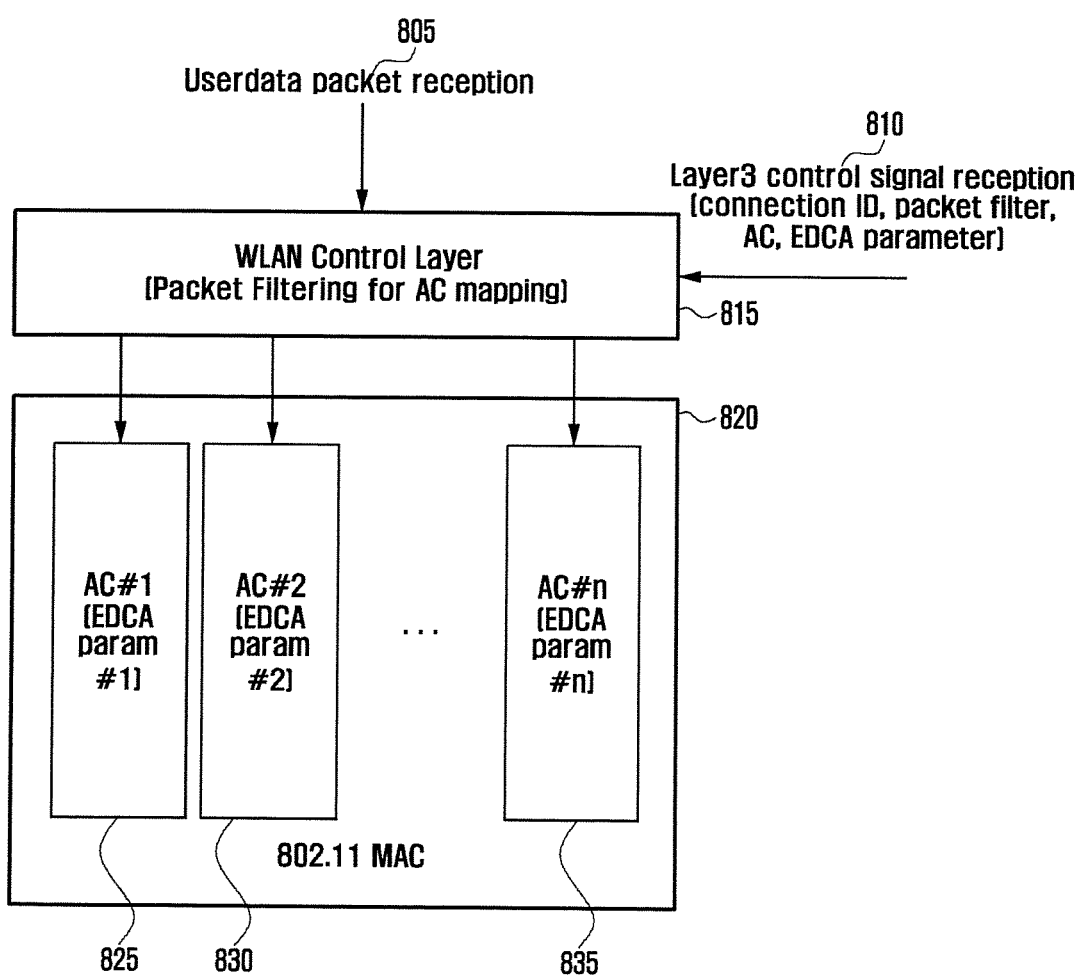
FIG. 8 is a diagram illustrating the internal configuration of a User Equipment according to an embodiment of the present invention.

FIG. 8 is a diagram illustrating the internal configuration of a User Equipment according to an embodiment of the present invention. According to an embodiment of the present invention, a User Equipment has a controller, and the controller may include a WLAN controller for controlling QoS and a connection of a WLAN, and a 3GPP controller for controlling a general 3GPP function, wherein the two controllers may be separately included, or may be included in a single integrated form.

Referring to FIG. 8, the User Equipment may include an 802.11 MAC and a WLAN control layer 815 for controlling the 802.11 MAC. The WLAN control layer may correspond to the aforementioned User Equipment controller, and particularly, to a WLAN controller. The WLAN control layer 815 has a function of transmitting/receiving a layer-3 control message to/from the aforementioned TWAG, and includes a function of attaching a layer-3 header to a user data packet transmitted to a TWAN. The User Equipment may determine whether to transfer a packet to a WLAN control layer and to process the packet or to transfer the packet directly to a higher layer (e.g.: an IP layer) using the EtherType of a received 802.11 MAC packet.

As described in the above embodiment, the WLAN control layer 815 may receive a layer-3 control message 810 from the TWAG, wherein the control message 815 may include an ID of a logical connection generated between the UE and the TWAG, and a parameter (at least one among a packet filter, an AC to be used, and an EDCA parameter to be used) for the relevant connection.

On the basis thereof, when a user data packet 805 is generated, the WLAN control layer 815 finds out, when necessary, a logical connection matched through a packet filter, attaches a layer-3 header thereto, and then inserts transmission queues 825 to 835 having an appropriate AC or EDCA parameter to the packet. The following operation progresses according to the basic operation of the 802.11 EDCA.

Hereinafter, flows according to the embodiments of the present invention will be described.

Figure 9:
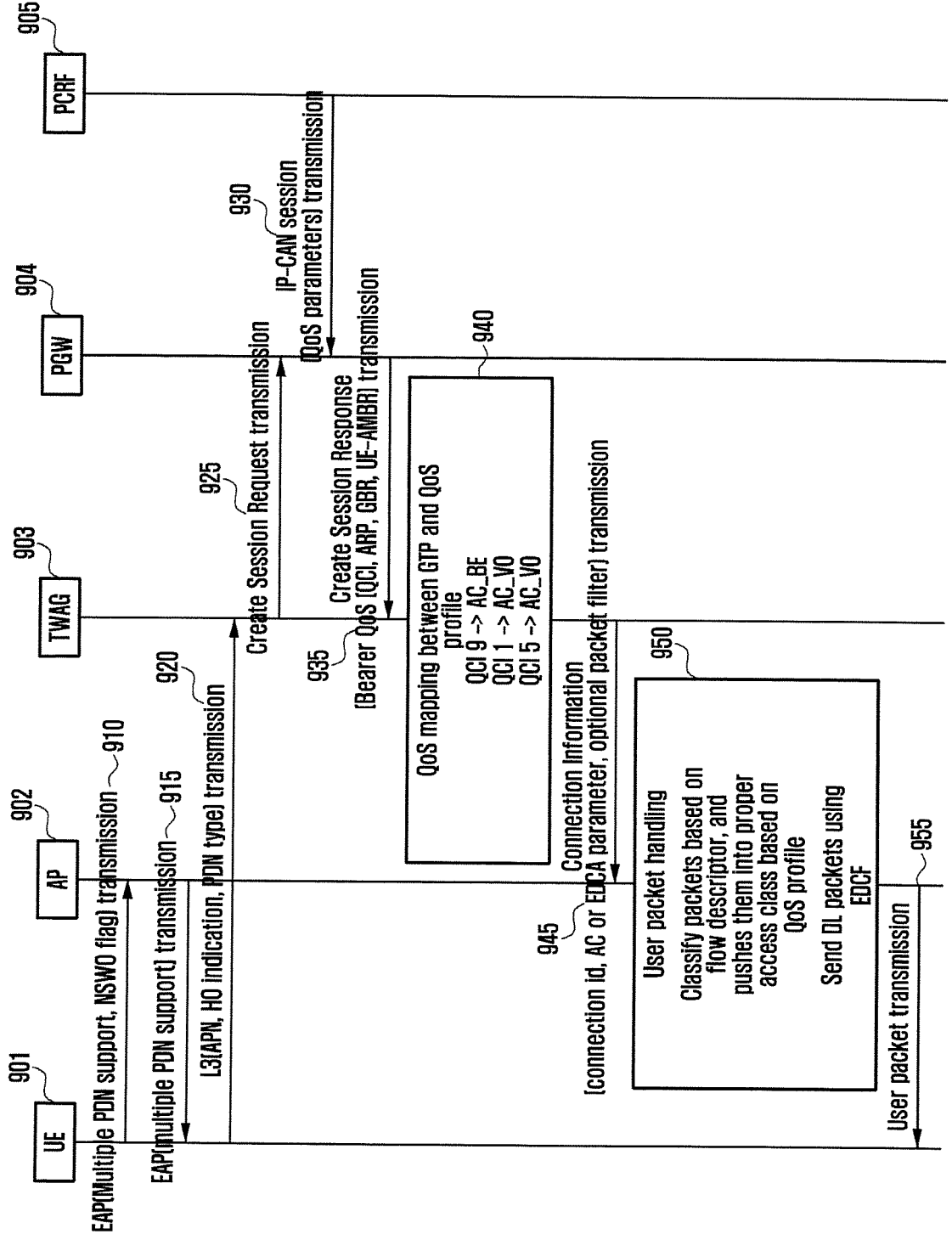
FIG. 9 is a diagram illustrating a procedure in which a trusted WLAN access gateway (TWAG) transfers information to a WLAN for QoS control according to an embodiment of the present invention.

FIG. 9 is a diagram illustrating a procedure in which a trusted WLAN access gateway (TWAG) transfers information to a WLAN for QoS control according to an embodiment of the present invention.

Referring to FIG. 9, according to an embodiment, signals may be transmitted and received between a UE 901, an AP 902, a TWAG 903, a PGW 904, and a Policy Charging Resource Function (PCRF) 905. According to an embodiment, the AP 902 and the TWAG 903 may be collocated, and may be logically separated entities. In addition, according to an embodiment, the AP 902 may be described as a WLAN, and the UE 901 may be described as a terminal or a User Equipment.

When a connection is generated through a procedure according to an embodiment aforementioned with reference to FIG. 5, the TWAG 903 generates a GTP tunnel with the P-GW 904. The connection may be a logical connection, wherein a newly generated case or a case resulting from movement to a WLAN by an HO in 3GPP may be included. According to the embodiment of FIG. 9, the PCRF 905 may transmit an IP-CAN session to the PGW 904 as shown in operation 930, wherein the IP-CAN session may include a QoS parameter.

In operation 935, the PGW 904 may transmit a Create Session Response. The Create Session Response may include one or more of a QCI, an ARP, a GBR, and a UE-AMBR, which can represent the QoS of a bearer.

In operation 940, the TWAG 903 determines a QoS parameter to be used in the WLAN 902 on the basis of the QoS context (a QCI, an ARP, an APN, a GBR, and a UE-AMBR, or the like) of a GTP bearer, which has been received from the P-GW 904. This may be determined according to a mapping relation between QCIs and ACs, which is described above.

In operation 945, the TWAG 903 may transfer, through an interface with the WLAN 902, information to be used in a logical connection, an ID of the connection, a packet filter for packet filtering when necessary, and a corresponding access class or EDCA parameter, wherein the parameter may be transferred, for example, through a connection information message.

In operation 950, when a DL packet is transmitted using information received in operation 945, as described above, the WLAN 902 performs a packet filtering when necessary, finds out an AC or EDCA parameter for a corresponding connection, and performs a transmission control for the DL packet.

In operation 955, the WLAN 902 may transmit a user packet, which has been subjected to operation 950, to the UE 901.

Figure 10:
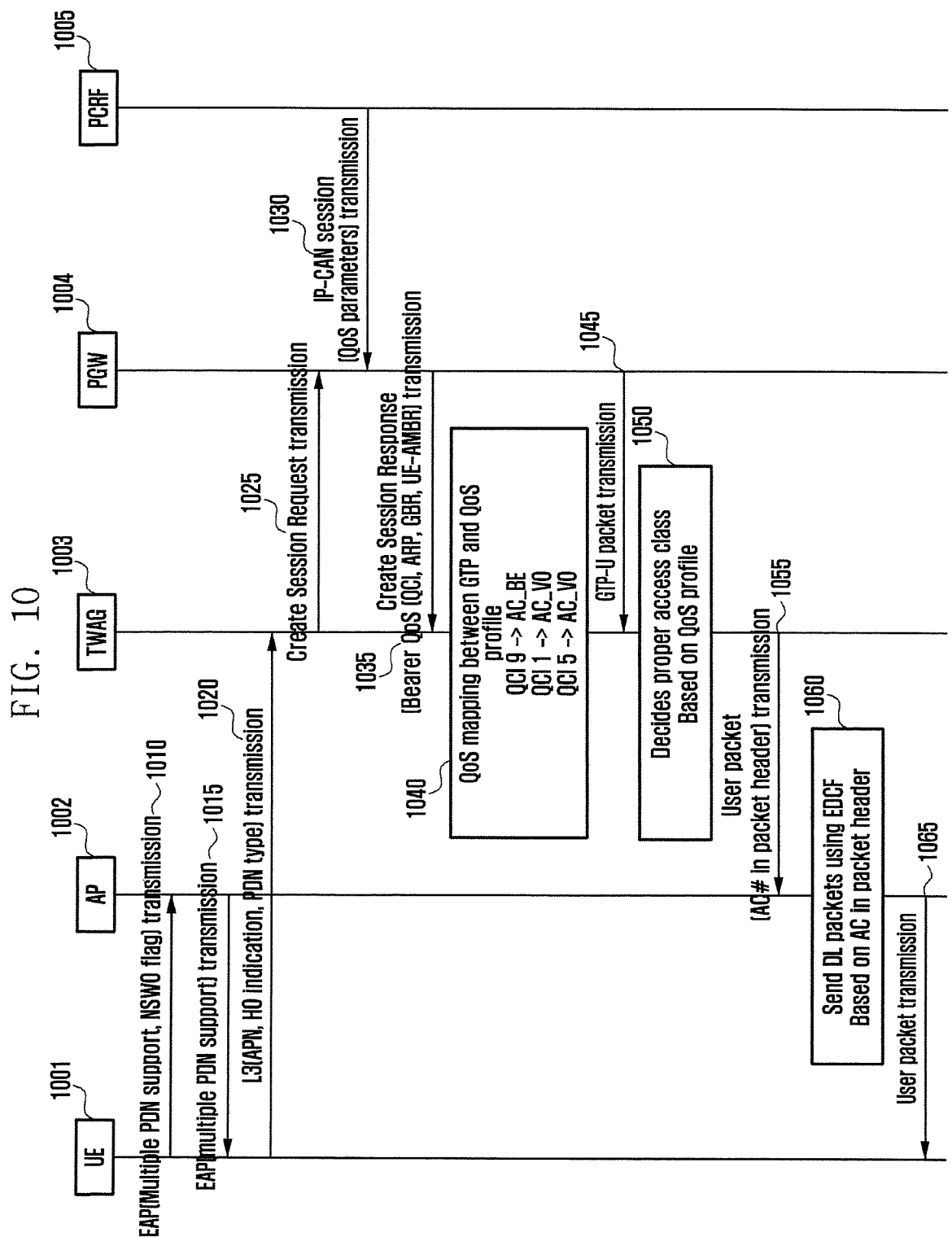
FIG. 10 is a diagram illustrating a procedure for controlling QoS through a user plane according to an embodiment of the present invention.

FIG. 10 is a diagram illustrating a procedure for controlling QoS through a user plane according to an embodiment of the present invention. FIG. 10 shows a method for enabling QoS to be controlled through a user plane, differently from the method in which the TWAG controls QoS in WLAN through control message exchange. Referring to FIG. 10, according to an embodiment, signals may be transmitted and received between a UE 1001, an AP 1002, a TWAG 1003, a PGW 1004, and a PCRF 1005. According to an embodiment, the AP 1002 and the TWAG 1003 may be collocated, and may be logically separated entities. In addition, according to an embodiment, the AP 1002 may be described as a WLAN, and the UE 1001 may be described as a terminal or a User Equipment.

In this embodiment, the operations in operations 1010 to 1040 may be performed in the same manner as those in operations 910 to 940 of FIG. 9.

In operation 1045, the TWAG 1003 may receive downlink user data from the P-GW 1004. According to an embodiment, the downlink user data may include a GTP-U packet.

In operation 1050, the TWAG 1003 performs a packet filtering when necessary, and determines a QoS parameter to be used in a WLAN on the basis one or more of the QoS contexts (a QCI, an ARP, an APN, a GBR, and a UE-AMBR, or the like) of a GTP bearer, which has been stored when generating a GTP tunnel with the P-GW 1004.

Thereafter, in operation 1055, when transferring a user data packet through an interface with the WLAN 1002, the TWAG 1003 transmits a QoS parameter (e.g.: an AC or EDCA parameter) to be used in the WLAN 1002, together with the user data packet, by including the QoS parameter in the user data packet. For example, the QoS parameter may be included in the header of a message which contains the user data packet and is transferred by the TWAG to the WLAN.

In operation 1060, the WLAN 1002 which has received information transmitted in operation 1055 may perform a transmission control for a DL packet using an AC or EDCA parameter, as described above.

In operation 1065, the transmission-controlled user packet may be transmitted to the UE 1001.

Comparing the embodiment described with reference to FIG. 10 with the above embodiment, there is a difference in that the WLAN 1002 has only to utilize information which the TWAG 1003 has transferred together with a user data packet.

Figure 11:
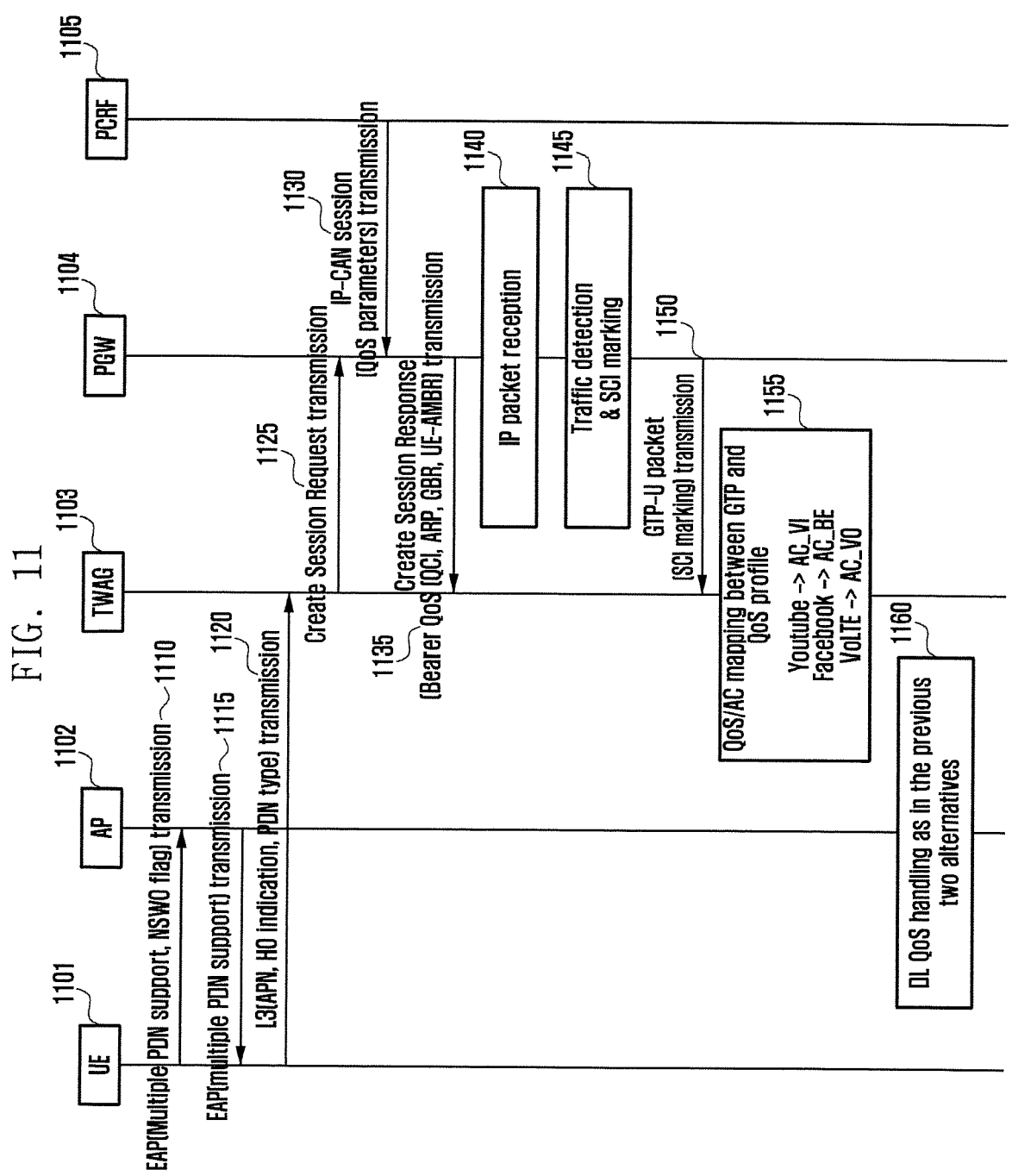
FIG. 11 is a diagram illustrating a procedure for applying QoS control according to segmented services according to an embodiment of the present invention.

FIG. 11 is a diagram illustrating a procedure for applying QoS control according to segmented services according to an embodiment of the present invention.

Referring to FIG. 11, according to an embodiment, signals may be transmitted and received between a UE 1101, an AP 1102, a TWAG 1103, a PGW 1104, and a PCRF 1105. According to an embodiment, the AP 1102 and the TWAG 1103 may be collocated, and may be logically separated entities. In addition, according to an embodiment, the AP 1102 may be described as a WLAN, and the UE 1101 may be described as a terminal or a User Equipment.

In this embodiment, the operations in operations 1110 to 1135 may be performed in the same manner as those in operations 1010 to 1035 of FIG. 10.

In operation 1140, the PGW 1104 may receive an IP packet.

In operations 1145 and 1150, when transferring a user data packet to the TWAG 1103, the P-GW 1104 includes, in the user data packet, information (e.g.: a service class identifier (SCI) or a flow QoS index) representing a service type or a priority using information which has been detected by the P-GW 1104 or given by a TDF, and transfers the user data packet. The information may be included in the header of a GTP-U packet transferred from the P-GW to the TDF and/or in a specific field of an IP header. According to an embodiment, the specific field of an IP header may include, for example, a Differentiated Services Code Point (DSCP) field.

In operation 1155, when performing the above two embodiments on the basis thereof, the TWAG 1103 may take more segmented service/priority information into consideration, other than taking only basic QoS parameters (QCI and the like) into consideration. That is to say, with respect to various service flows included in one logical connection, mutually differentiated ACs or EDCA parameters may be applied to perform a transmission control. In operation 1160, the WLAN 1002 may perform an operation similar to that performed by the WLAN in FIG. 9 or 10.

Figure 12:
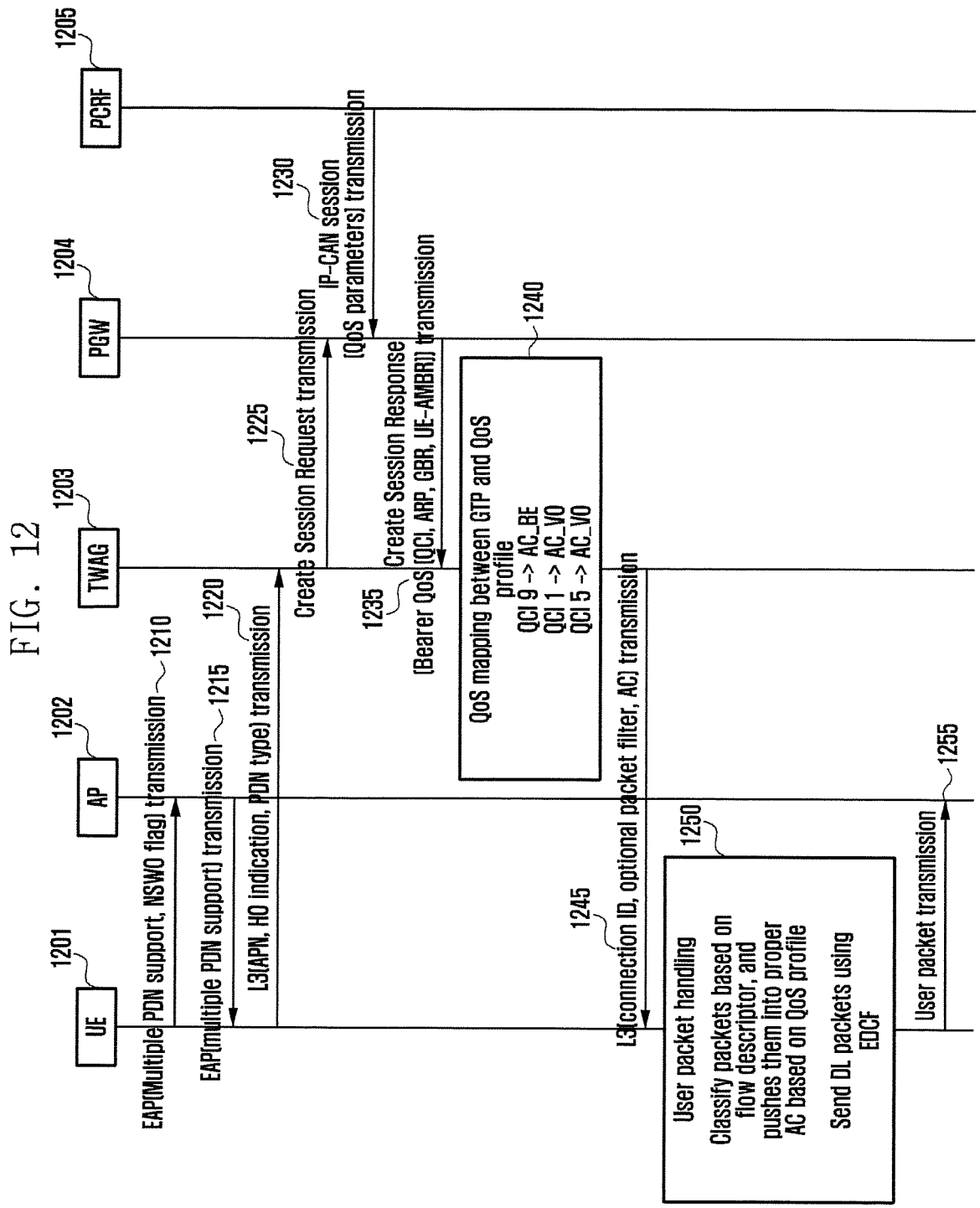
FIG. 12 is a diagram illustrating a procedure for enabling a User Equipment to perform QoS control for a user uplink packet according to an embodiment of the present invention.

FIG. 12 is a diagram illustrating a procedure for enabling a User Equipment to perform QoS control for a user uplink packet according to an embodiment of the present invention.

Referring to FIG. 12, according to an embodiment, signals may be transmitted and received between a UE 1201, an AP 1202, a TWAG 1203, a PGW 1204, and a PCRF 1205. According to an embodiment, the AP 1202 and the TWAG 1203 may be collocated, and may be logically separated entities. In addition, according to an embodiment, the AP 1202 may be described as a WLAN, and the UE 1201 may be described as a terminal or a User Equipment.

In this embodiment, the operations in operations 1210 to 1240 may be performed in the same manner as those in operations 1010 to 1040 of FIG. 10.

When a logical connection is generated (i.e. when a new logical connection is generated, or when a logical connection moves to the WLAN 1202 by an HO in 3GPP) according to the procedure described in the above embodiment, the TWAG 1203 generates a GTP tunnel with the P-GW 1204. Thereafter, the TWAG 1203 may determine an AC to be used in the WLAN 1203 on the basis of the QoS context (a QCI, an ARP, an APN, a GBR, and a UE-AMBR, or the like) of a GTP bearer received from the P-GW 1204, or on the basis of a service class or priority which the P-GW 1204 has included in a user data packet (GTP-U packet header).

Thereafter, in operation 1245, the TWAG 1203 transfers, to the User Equipment 1201, one or more of: information to be used for a logical connection; an ID of the connection; a packet filter for packet filtering when necessary; and a corresponding access class by using a layer-3 message.

In operation 1250, as described above, when an UL packet is generated, the UE 1201 performs a transmission control for the UL packet using the information in such a manner as to perform a packet filtering when necessary, to determine an AC for a corresponding connection, and then to find out a corresponding EDCA parameter.

In operation 1255, the UE 1201 may transmit the transmission-controlled user packet to the WLAN 1202.

Although the present embodiment has been described about a procedure in which the TWAG 1203 transfers information for QoS control to the UE 1201 through a layer-3 control message, the present invention may include, through a little change, a method in which the TWAG 1203 transfers the information to the WLAN 1202, and the WLAN 1202 transfers the information to the User Equipment 1201 through an appropriate MAC control message. That is to say, in this case, the MAC control message (or a control IE) may include one or more of a packet filter, an AC, and a connection ID which the User Equipment is to apply.

Figure 13:
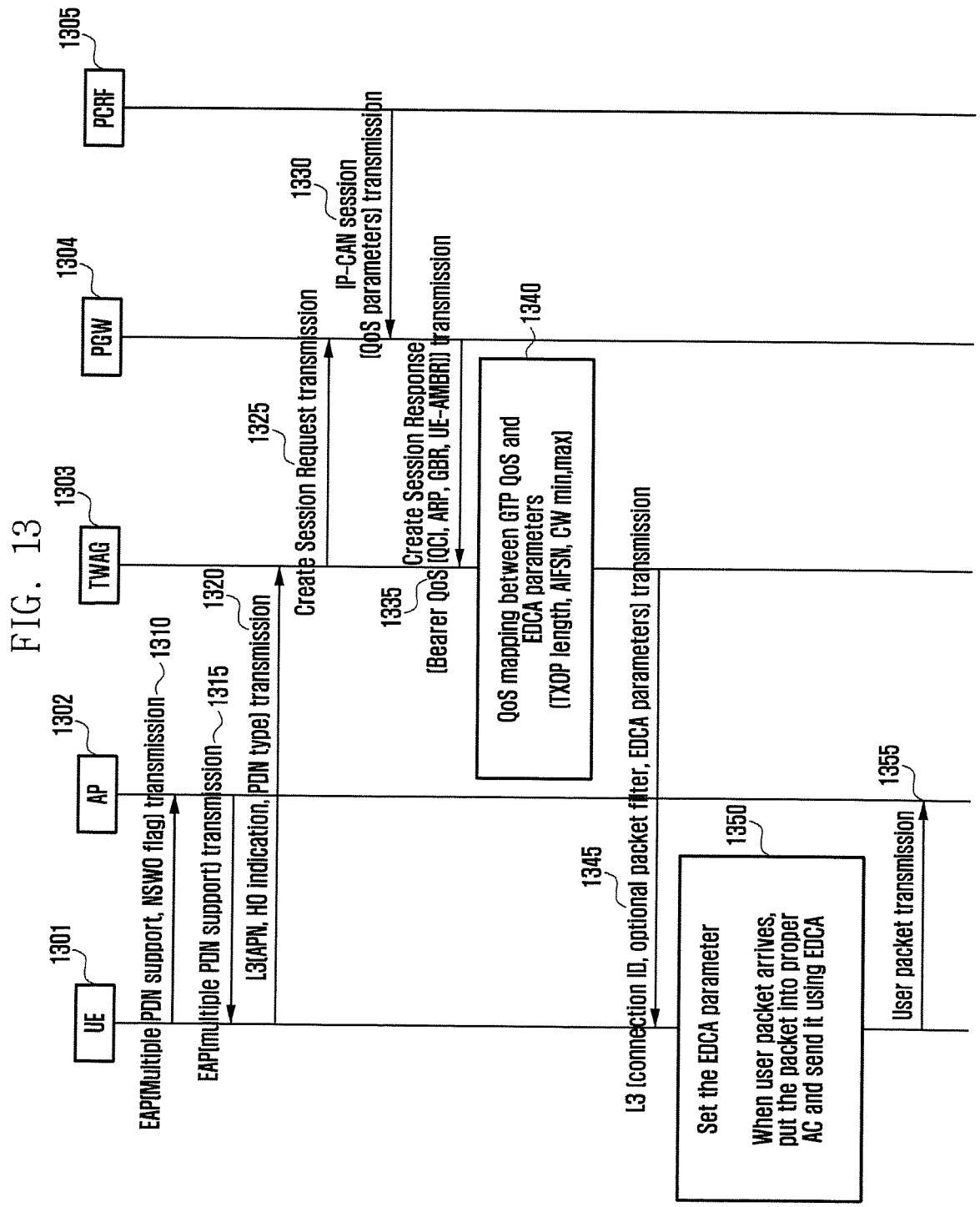
FIG. 13 is a diagram illustrating a procedure for enabling a User Equipment to perform QoS control for a user uplink packet according to another embodiment of the present invention.

FIG. 13 is a diagram illustrating a procedure for enabling a User Equipment to perform QoS control for a user uplink packet according to another embodiment of the present invention.

Referring to FIG. 13, according to an embodiment, signals may be transmitted and received between a UE 1301, an AP 1302, a TWAG 1303, a PGW 1304, and a PCRF 1305. According to an embodiment, the AP 1302 and the TWAG 1303 may be collocated, and may be logically separated entities. In addition, according to an embodiment, the AP 1302 may be described as a WLAN, and the UE 1301 may be described as a terminal or a User Equipment.

In this embodiment, the operations in operations 1310 to 1335 may be performed in the same manner as those in operations 1210 to 1235 of FIG. 12.

When a logical connection is generated (i.e. when a new logical connection is generated, or when a logical connection moves to the WLAN 1302 by an HO in 3GPP) according to the procedure described in the above embodiment, the TWAG 1303 generates a GTP tunnel with the P-GW 1304.

Thereafter, in operation 1340, the TWAG 1303 may determine an EDCA parameter to be used in the WLAN 1302 on the basis of the QoS context (a QCI, an ARP, an APN, a GBR, and a UE-AMBR, or the like) of a GTP bearer received from the P-GW 1304, or on the basis of a service class or priority which the P-GW 1304 has included in a user data packet. The EDCA parameter may include at least one of a TXOP, an AIFSN, a CWmin and a CWmax.

Thereafter, in operation 1345, the TWAG 1303 transfers, to the User Equipment 1301, one or more of: information to be used for a logical connection; an ID of the connection; a packet filter for packet filtering when necessary; and a corresponding EDCA parameter (a TXOP, an AIFSN, a CWmin and a CWmax) by using a layer-3 message.

In operation 1350, as described above, when an UL packet is generated, the UE 1301 performs a transmission control for the UL packet using the information in such a manner as to perform a packet filtering when necessary and to find out an EDCA parameter for a corresponding connection.

In operation 1355, the UE 1301 may transmit the transmission-controlled user packet to the WLAN 1302.

Although the present embodiment has been described about a procedure in which the TWAG 1303 transfers information for QoS control to the UE 1301 through a layer-3 control message, the present invention may include, through a little change, a method in which the TWAG 1303 transfers the information to the WLAN 1302, and the WLAN 1302 transfers the information to the User Equipment 1301 through an appropriate MAC control message. That is to say, in this case, the MAC control message (or a control IE) may include one or more of a packet filter, an AC, and a connection ID which the User Equipment is to apply.

Figure 14:
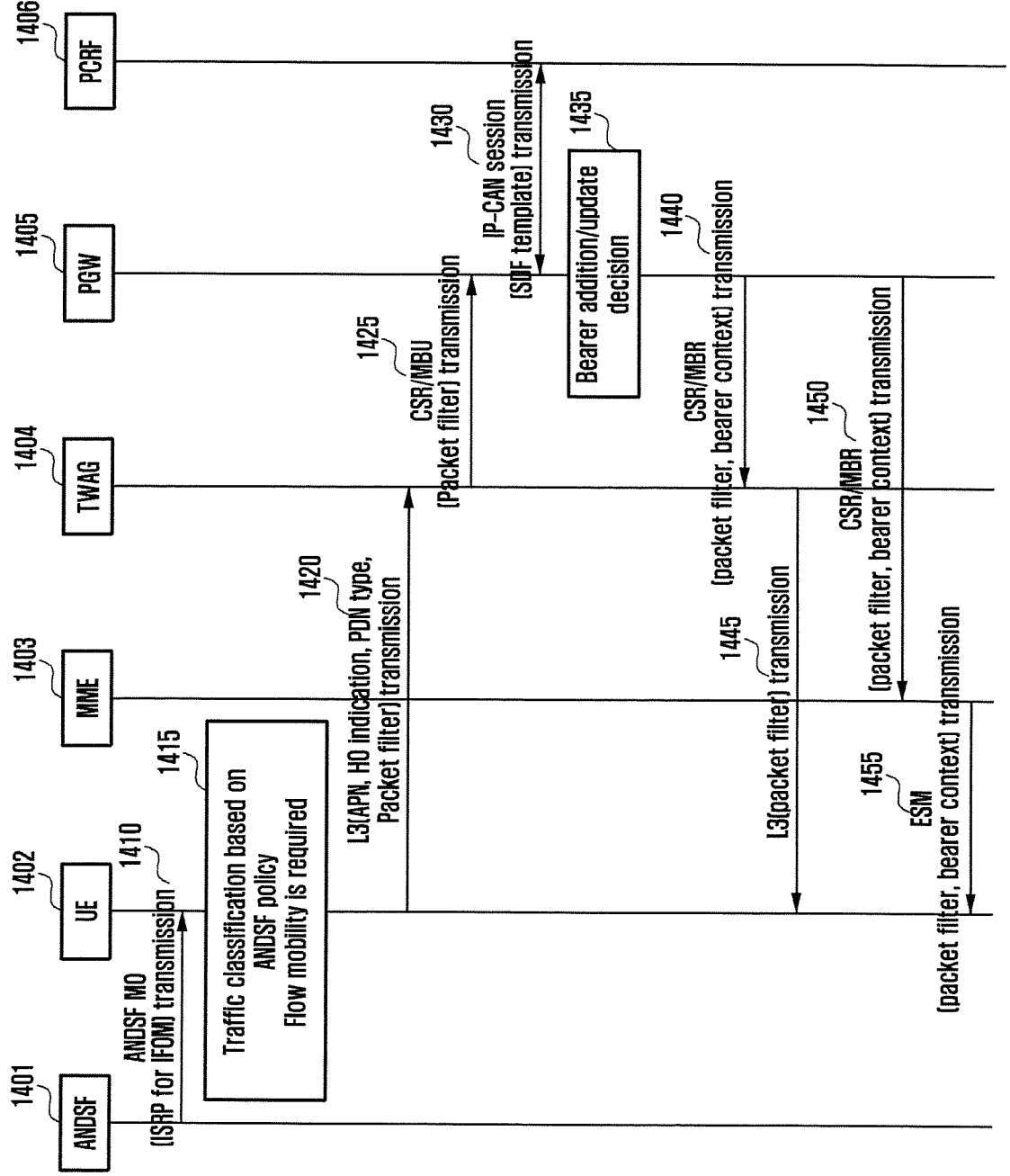
FIG. 14 is a diagram illustrating a procedure for handing over traffic according to IP flows between a 3GPP access network and a non-3GPP access network according to an embodiment of the present invention.

FIG. 14 is a diagram illustrating a procedure for handing over traffic according to IP flows between a 3GPP access network and a non-3GPP access network according to an embodiment of the present invention.

Referring to FIG. 14, according to an embodiment, signals may be transmitted and received between an Access Network Discovery and Selection Function (ANDSF) 1401, a UE 1402, a mobility management entity (MME) 1403, a TWAG 1404, a PGW 1405, and a PCRF 1406. In addition, according to an embodiment, the UE 1402 may be described as a terminal or a User Equipment.

In operation 1410, the ANDSF 1401 may transfer a management object (MO), which contains a policy/rule for IP Flow Mobility and Seamless Offload (IFOM), to the User Equipment 1402.

In operation 1415, when traffic is generated, the User Equipment 1402 may perform a traffic classification on the basis of information of the MO of the ANDSF.

In this case, when it is determined to be necessary to move an IP flow from a 3GPP access network to a non-3GPP access network, the User Equipment 1402 may transfer a layer-3 control message (e.g.: a flow mobility request) to the TWAG 1404/ePDG in operation 1420. The flow mobility request message may include one or more of: an APN for a PDN connection; an HO indicator; a PDN type; a packet filter or a flow descriptor for corresponding traffic; and ID information of a logical connection. In addition, the message may include the entire or a part of the policy or rule received from the ANDSF.

In operation 1425, the TWAG/ePDG 1404 which has received the message may transfer a GTP-C message for generation or update of a bearer to the P-GW 1405. According to an embodiment, the TWAG/ePDG 1404 may include at least one of a flow descriptor and a packet filter for traffic, which are targets of the IP flow mobility, in the message to be transmitted.

In operation 1430, the P-GW 1405 may update a PCC rule with the PCRF 1406 when necessary on the basis of information received from the TWAG/ePDG 1404.

In operation 1435, the P-GW 1405 may determine whether to generate or to update a bearer.

According to a result of the determination in operation 1435, the PGW 1405 performs a procedure of generating or updating a GTP bearer with the TWAG/ePDG 1404. During the procedure, the P-GW 1405 transfers a DL/UL packet filter for the corresponding bearer to the TWAG/ePDG 1404. Through this, the TWAG/ePDG 1404 obtains information on an IP flow for transmission through a non-3GPP access.

When necessary, in operation 1445, the TWAG/ePDG 1404 may transfer an updated packet filter to the User Equipment 1402 through a layer-3 control message, and additionally, may transfer information on QoS control, as in the above embodiment.

Meanwhile, when the IP flow moves from a 3GPP access network to a non-3GPP access network, the P-GW 1405 may perform a procedure of correcting a bearer context (deleting a bearer, or updating the resource, e.g.: a packet filter or GBR value, of a bearer) through the S-GW/MME 1403 in operations 1450 to 1455.

Each of communication entities disclosed in the embodiments may include a transmission/reception unit capable of transmitting/receiving signal to/from another entity, and a controller capable of controlling the transmission/reception unit and processing data transmitted/received through the transmission/reception unit.

Meanwhile, although the exemplary embodiments of the present invention have been illustrated in the present specification and the accompanying drawings and specific terms have been used, they are used in a general meaning in order to assist in the understanding the present invention and do not limit the scope of the present invention. It will be obvious to those skilled in the art to which the present invention belongs that other modifications based on the spirit of the present invention may be made in addition to the above-mentioned exemplary embodiments.

The invention claimed is:

1. A method of a terminal in a communication system, the method comprising:
   transmitting, to a wireless local area network (WLAN), information for a requested connection mode;
   receiving, from the WLAN, information for a supported connection mode, and information for whether non-seamless WLAN offload is allowed;
   transmitting, to the WLAN, a packet data network (PDN) connectivity request message including information for a routing rule, information for a type of PDN; and
   receiving, from the WLAN, a PDN connectivity accept message including the type of PDN, information for a selected access point name (APN), information for an internet protocol address of a PDN connection, a bearer identity for the PDN connection, information for a quality of service (QoS) for a bearer, and information for user plane connection identity,
   wherein a user plane packet for a connection between the WLAN and the terminal is encapsulated based on the information for user plane connection identity.

2. The method of claim 1, wherein at least one of information for a requested type of PDN or the PDN connectivity request message further includes information for a requested APN is transmitted to the WLAN.

3. The method of claim 1, wherein, in case that the supported connection mode is a multi-connection mode, information for WLAN control protocol (WLCP) is received with the information for the supported connection mode.

4. The method of claim 1, wherein, in case that the request connection mode is a multi-connection mode and the supported connection mode is the multi-connection mode, a layer 3 configuration is performed for a PDN connection.

5. A method of a wireless local area network (WLAN) in a communication system, the method comprising:
   receiving, from a terminal, information for a requested connection mode;
   transmitting, to the terminal, information for a supported connection mode, and information for whether non-seamless WLAN offload is allowed;
   receiving, from the terminal, a packet data network (PDN) connectivity request message including information for a routing rule, and information for a type of PDN; and
   transmitting, to the terminal, a PDN connectivity accept message including the information for the type of PDN, information for a selected access point name (APN), information for an internet protocol (IP) address of a PDN connection, a bearer identity for the PDN connection, information for a quality of service (QoS) for a bearer, and information for user plane connection identity,
   wherein a user plane packet for a connection between the WLAN and the terminal is encapsulated based on the information for user plane connection identity.

6. The method of claim 5, wherein at least one of information for a requested type of PDN or the PDN connectivity request message further includes information for a requested APN is received from the terminal.

7. The method of claim 5, wherein, in case that the supported connection mode is a multi-connection mode, information for WLAN control protocol (WLCP) is transmitted with the information for the supported connection mode.

8. The method of claim 5, wherein, in case that the request connection mode is a multi-connection mode and the supported connection mode is the multi-connection mode, a layer 3 configuration is performed for a PDN connection.

9. A terminal in a communication system, the terminal comprising:
   a transceiver; and
   a controller configured to control the transceiver to:
   transmit, to a wireless local area network (WLAN), information for a requested connection mode,
   receive, from the WLAN, information for a supported connection mode, and information for whether non-seamless WLAN offload is allowed,
   transmit, to the WLAN, a packet data network (PDN) connectivity request message including information for a routing rule, and information for a type of PDN, and
   receive, from the WLAN, a PDN connectivity accept message including the information for the type of PDN, information for a selected access point name (APN), information for an internet protocol (IP) address of a PDN connection, a bearer identity for the PDN connection, information for a quality of service (QoS) for a bearer, and information for user plane connection identity,
   wherein a user plane packet for a connection between the WLAN and the terminal is encapsulated based on the information for user plane connection identity.

10. The terminal of claim 9, wherein at least one of information for a requested type of PDN or the PDN connectivity request message further includes information for a requested APN is transmitted to the WLAN.

11. The terminal of claim 9, wherein, in case that the supported connection mode is a multi-connection mode, information for WLAN control protocol (WLCP) is received with the information for the supported connection mode.

12. The terminal of claim 9, wherein, in case that the request connection mode is a multi-connection mode and the supported connection mode is the multi-connection mode, a layer 3 configuration is performed for a PDN connection.

13. A wireless local area network (WLAN) in a communication system, the WLAN comprising:
    a transceiver; and
    a controller configured to control the transceiver to:
    receive, from a terminal, information for a requested connection mode,
    transmit, to the terminal, information for a supported connection mode, and information for whether non-seamless WLAN offload is allowed the requested type of connectivity has been granted,
    receive, from the terminal, a packet data network (PDN) connectivity request message including information for a routing rule, and information for a type of PDN, and
    transmit, to the terminal, a PDN connectivity accept message including the information for the type of PDN, information for a selected access point name (APN), information for an internet protocol (IP) address of a PDN connection, a bearer identity for the PDN connection, information for a quality of service (QoS) for a bearer, and information for user plane connection identity,
    wherein a user plane packet for a connection between the WLAN and the terminal is encapsulated based on the information for user plane connection identity.

14. The WLAN of claim 13, wherein the PDN connectivity request message further includes at least one of information for a type of PDN or the PDN connectivity request message further includes information for a requested APN is received from the terminal.

15. The WLAN of claim 13, wherein, in case that the supported connection mode is a multi-connection mode, information for WLAN control protocol (WLCP) is transmitted with the information for the supported connection mode.

16. The WLAN of claim 13, wherein, in case that the request connection mode is a multi-connection mode and the supported connection mode is the multi-connection mode, a layer 3 configuration is performed for a PDN connection.

* * * * *